Patented Apr. 20, 1954

2,676,137

UNITED STATES PATENT OFFICE 2,676,137

PROCESSES FOR THE SIMULTANEOUS PRODUCTION OF YEAST AND SPIRIT

Karl Schneider, Mannheim, Germany, assignor to Backhefe G. m. b. H., Frankfurt am Main, Germany, a firm No Drawing. Application December 5, 1950, Serial No. 199,368

6 Claims. (Cl. 195—37)

According to the present invention a process for the production together of yeast and spirit is provided, by which the purity of the spirit obtained and the quality and quantity of the resultant yeast is improved.

In the known processes for the obtaining together of yeast and spirit it is usual to attain some 20–50% of yeast and 23–12% of spirit in the spirits-yielding fermentation. The spirit concentration in the wort thus is 1.0–2.5%. Thereafter a fermentation follows which takes place in the known way with or without the obtaining of alcohol. In the former case the concentration of the alcohol in the wort attains an increase of about 0.2 to 0.8% by volume.

According to the invention one operates in such a way that one reaches conditions which hinder the growth of the yeast in the spirit-yielding fermentations thereby raising considerably the alcohol concentration. For this purpose one may for example use in higher concentration substrates which are poor in or free from growth promoting and activating substances which in fermentation give rise to a higher alcohol content in the wort or also by limiting the oxygen supply by means of a reduction in the quantity of air. The corresponding higher alcohol concentration in the wort can likewise serve as a fermentation-hindering medium. Following removal of the alcohol formed from the yeast it is then essential to increase the yeast with a fresh introduction of fermentation-hindering so that finally an acceleration of the yeast growth is brought about by transferring to the usual fermentation conditions.

As the conditions hindering the growth of the yeast may be chosen singly or in combination the addition of difficultly fermentable substrates, a reduced quantity of substrate, the use of substrates poor in or free from growth promoting and activating substances, limitation of the nitrogen content, nitrogen removal or also the employment of an abnormally low temperature of about 12–22° C. in place of 26–30° C.

The use according to the invention of substrates poor in or free from growth promoting and activating substances in the spirit fermentation or minimal dosing of the oxygen introduction proves to be effective. The alcohol concentration achieved in the spirit fermentation varies from about 4 to 9%. The conditions decreasing the growth of the yeast or of its ability to ferment or multiply can also happen at the beginning of the culture.

The hindering effects which are active in the spirit yielding fermentations have the result that the yeast has to undergo a reduced hindering-treatment immediately after the removal of the alcohol. If first therefore a slow breaking up of the hindering takes place, the yeast can be submitted to normal fermentation conditions, by which it gives a yield higher than with the known processes and has desirable improvements of quality, relative to durability, activity (ability of leavening) (oven activity) and retention of activity. The higher one chooses the concentration of alcohol in the wort and the more effective the hindering of the fermentation of the yeast in the second stage, the more the advantage of the process becomes optimal.

The process according to the invention is especially suitable in the obtaining of alcohol with a yield of about 5 to 23% with a simultaneous production of a desirable quantity of yeast.

The alcohol obtained is substantially purer than with the known processes which are carried out with simultaneous production of yeast and spirit. It can be rectified without any particular difficulty.

The economic value of the operation according to the invention consists in that, with the same expenditure of energy four or five times the quantity of spirit can be produced compared with the known processes. In this way by the use of finest distributed air considerable quantities of waste steam and thus considerable quantities of energy are saved.

In order that the invention may be well understood the following examples are given only as illustrations:

Example 1

A strain of yeast of normal origin is introduced in a pure culture process without fattening. The introduced yeast is mixed with 500 kg. beet-molasses with the addition of 9 kg. of di-ammonium phosphate at 26° C. and a pH of 4.5–5. After ¾ of the molasses have been fermented, 3,500 kg. of molasses are so allowed to run into the fermentation that the fermenting liquid turns between 7–8° Balling and the alcohol content of the ferment rises 4–7%. No nitrogen is added and the quantity of phosphate added is 15 kg. During the total time of the fermentation 50 cubic metres of air is introduced hourly into the fermentation mixture in the finest distribution. After completion of the fermentation the ferment has an alcohol content of 7.4%. The yeast is separated from the alcoholic wort by means of a pressure separator. The yeast obtained (600 kg.) is the pitching or seeding yeast of the next fermentation stage which begins at 12° C. without a nitrogen—or phosphate—addition under weak aeration with 200 kg. molasses and is continued in the flowing process with hourly additions of 100–150 kg. molasses with a rising temperature up to 21° C. with hindering. 1000 kg. of molasses are used. For this one can use also wood sugar, sulphite lyes or cane-molasses. The hindering is stopped further by a strong running in of molasses, which amounts to 200–300 kg. molasses hourly, by the addition of the corresponding quantities of nitrogen and phosphate and through strong aeration. In this phase the process uses 1500 kg. of molasses. The yeast obtained amounts to 3020 kg. the spirit obtained 1250 litres. The yields, calculated on 50% sugar are, yeast 44.7% and spirit 18.5%.

*Example 2*

Yeast is introduced into the pure culture process on corn wort or on molasses with the addition of malt germs. There follows a spirit yielding fermentation on beet molasses which gives 200 kg. yeast. This fermentation serves as the start for a spirit fermentation with 5000 kg. of cane-molasses. The fermentations takes place as is described in Example 1. However only 5 to 10 cubic metres of air are passed through hourly and 50 kg. of ammonium sulphate and 10 kg. diammonium phosphate are added to the fermentation material. After the end of the fermentation the wort has an alcohol content of 8.8%. In place of the cane molasses wood sugar molasses may be used in corresponding proportion. The yeast is separated in a pressure separator and then follows a fermentation with hindrance as described in Example 1, with 1000 kg. beet molasses. The hindering lasts somewhat longer. Then follows the normal fermentation with 1500 kg. molasses. 3030 kg. yeast and 1700 litres of spirit are obtained. 8500 kg. of molasses were used with 48.5% sugar content, so that the yeast yield is 36.8% and the spirit yield is 20.6%.

What I claim is:

1. A process of producing alcohol and yeast which comprises fermenting yeast in a medium of molasses under conditions to produce an alcohol content of about 4–8.8% in the presence of air and without added nitrogen, separating said yeast from said alcohol, then fermenting said yeast in a medium of molasses at a temperature of about 12° C. and gradually increasing said temperature to about 21° C., and thereafter fermenting said yeast in a favorable nutrient medium with added nitrogen, phosphate and strong aeration to promote the growth of yeast.

2. A process of producing alcohol and yeast which comprises fermenting yeast in a medium of molasses at about 26° C. and a pH of 4.5 to 5 in the presence of ammonium phosphate and under conditions to produce an alcohol content of about 4–8.8% in the presence of air and without added nitrogen, separating said yeast from said alcohol, then fermenting said yeast in a medium of molasses at a temperature of about 12° C. and gradually increasing said temperature to about 21° C. and thereafter fermenting said yeast in a favorable nutrient medium with added nitrogen, phosphate and strong aeration to promote the growth of yeast.

3. A process for the production of alcohol and yeast which comprises introducing yeast into a solution of molasses, fermenting the same in order to produce an alcohol containing wort of about 4% to about 9% alcohol by volume, separating said yeast from said wort, then introducing into said yeast relatively small quantities of molasses at a time with weak aeration at a starting temperature of about 12° C. and gradually increasing said temperature to about 21° C. during the hindering fermentation, and thereafter adding relatively large quantities of molasses, nitrogen and phosphate together with strong aeration to promote a high yield of yeast.

4. A process for the production of alcohol and yeast which comprises introducing yeast into a solution of molasses in the absence of nitrogen and phosphates, fermenting the same in order to produce an alcohol containing wort of about 4% to about 9% alcohol by volume, separating said yeast from said wort, then introducing into said yeast relatively small quantities of molasses at a time with weak aeration at a starting temperature of about 12° C. and gradually increasing said temperature to about 21° C. during the hindering fermentation, and thereafter adding relatively large quantities of molasses, nitrogen and phosphate together with strong aeration to promote a high yield of yeast.

5. A process for the production of alcohol and yeast which comprises introducing yeast into a solution of molasses, maintaining a temperature of about 26° C. and adding sufficient ammonium phosphate to provide a pH of 4.5 to 5.0, fermenting the same in order to produce an alcohol containing wort of about 4% to about 9% alcohol by volume, separating said yeast from said wort, then introducing into said yeast relatively small quantities of molasses at a time with weak aeration at a starting temperature of about 12° C. and gradually increasing said temperature to about 26° C. during the hindering fermentation, and thereafter adding relatively large quantities of molasses, nitrogen and phosphate together with strong aeration to promote a high yield of yeast.

6. A process for the production of alcohol and yeast which comprises introducing yeast into a solution of molasses, fermenting the same in order to produce an alcohol containing wort of about 4% to about 9% alcohol by volume, separating said yeast from said wort, then introducing into said yeast a medium of sulphite lye with weak aeration at a starting temperature of about 12° C. and gradually increasing said temperature to about 21° C. during the hindering fermentation, and thereafter adding relatively large quantities of molasses, nitrogen and phosphate together with strong aeration to promote a high yield of yeast.

References Cited in the file of this patent

UNITED STATES PATENTS

| Number | Name | Date |
|---|---|---|
| 1,722,803 | Klein | July 30, 1929 |
| 1,767,646 | Bratton | June 24, 1930 |
| 1,774,546 | Claassen | Sept. 2, 1930 |
| 1,920,395 | Jellinek | Aug. 1, 1933 |
| 2,013,456 | Braasch et al. | Sept. 3, 1935 |
| 2,059,980 | Bennett | Nov. 3, 1936 |
| 2,079,634 | Schultz | May 11, 1937 |
| 2,122,939 | Hansen | July 5, 1938 |
| 2,183,570 | Irvin et al. | Dec. 19, 1939 |
| 2,304,471 | Meyer et al. | Dec. 8, 1942 |
| 2,367,931 | Deloffre | Jan. 23, 1945 |

FOREIGN PATENTS

| Number | Country | Date |
|---|---|---|
| 390,114 | Great Britain | of 1932 |